May 4, 1965  H. T. LIBBY  3,182,178
WELDING METHOD AND APPARATUS
Filed Aug. 13, 1962
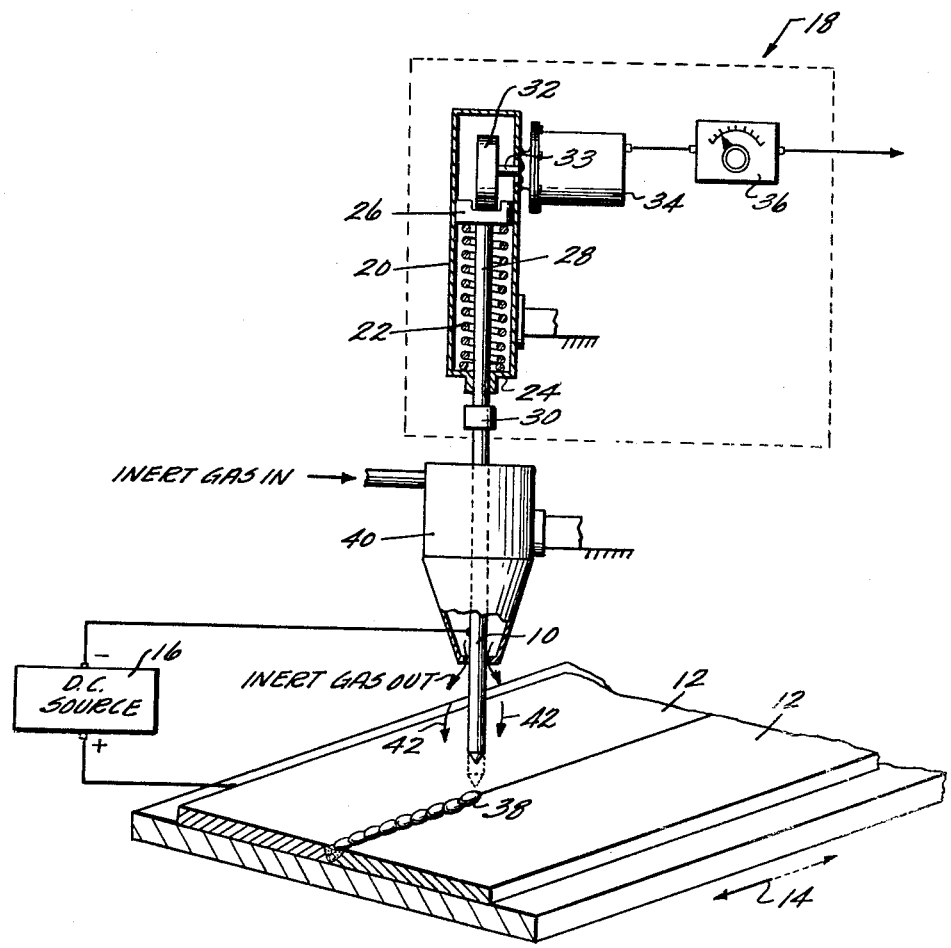
INVENTOR.
HENRY T. LIBBY
BY Lee H. Sachs
ATTORNEY

United States Patent Office 3,182,178
Patented May 4, 1965

3,182,178
WELDING METHOD AND APPARATUS
Henry Thomas Libby, Reading, Mass., assignor to General Electric Company, a corporation of New York
Filed Aug. 13, 1962, Ser. No. 216,366
7 Claims. (Cl. 219—130)

This invention relates to arc welding and, more particularly, to a method and apparatus for improving the weld structure by varying the current density of a direct current arc during continuous welding.

The structure of an arc weld is similar in many respects to the structure of a casting. The metal temperatures and freezing patterns closely approximate one another. In arc welding, a major problem is to prevent the formation of as-cast dendritic structures which form as the weld pool cools. Large dendritic structures are relatively weak and have more of a tendency to crack than do fine grained structures.

In prior welding methods and apparatus, vibratory forces have been applied to vibrate the workpiece during welding to break up larger grains as they begin to form. Other arrangements have applied vibratory forces to the welding electrode which moves the electrode in the molten pool without particular regard to direction, frequency and amplitude of movement.

Such types of vibration application through the workpiece or through the electrode to the weld pool can be effective in partially breaking up the dendritic structures but do not result in the grain refinement generally required in welded structures intended for operation under highly stressed conditions. Furthermore, and more important in certain applications, the applications of vibratory forces to the workpiece either directly or through the electrode is particularly impractical in the arc welding of thin sheets, especially thin sheets of difficult-to-weld material.

A principal object of this invention is to provide a method for producing a fine grained arc weld of improved strength and improved resistance to cracking by imparting motion to the weld pool through a variation in welding current density.

Another object is to provide a direct current welding apparatus to perform such method without vibrating the workpiece.

Still a further object is to provide a method and apparatus which prevents the formation of large grains in direct current arc welding by varying the current density of the arc.

These and other objects and advantages will be recognized from the following detailed description, examples and the drawing which is a fragmentary partially diagrammatic view of one form of the apparatus of the present invention.

Although the present invention will be described in connection with specific examples, it should be understood that such examples are not meant to be limitations on the scope of the present invention.

Briefly, the method aspect of the present invention, which is reflected by the apparatus, provides, in a method of arc welding, the steps of varying the current density of an arc between the arc welding apparatus and a workpiece being arc welded at a rate up to about 1000 cycles per second, and preferably 60–1000 cycles per second, while maintaining a continuous arc between the apparatus and the workpiece.

In one form, the apparatus of this invention includes means to vary the separation distance between the electrode and a workpiece during operation at a rate up to about 1000 cycles per second while maintaining a continuous welding arc. The most significant results can be obtained by apparatus which reciprocates the electrode normal to the workpiece at a rate between about 60 and 1000 cycles per second and at an amplitude of up to about 3/16 inch without extinguishing the arc.

Testing of certain materials such as an iron base alloy nominally consisting of, by weight, 0.08% C, 1.5% Mn, 0.7% Si, 15% Cr, 25% Ni, 1.3% Mo, 2% Ti, 0.3% V with the balance Fe, has shown that shaking a workpiece through the application to the workpiece during welding, and hence to the weld pool, of vibrations in the sonic range, for example 500 cycles per second at an amplitude of about 0.002″ and at 1000 cycles per second at an amplitude of about 0.0005″ does not affect the weld cracking susceptibility. However, the application of ultrasonic vibrations to shake the workpiece, for example at about 25,000 cycles per second in an amplitude of about 0.0005, greatly increases weld cracking susceptibility. Although the application of vibrations to the workpiece in both the sonic and ultrasonic ranges resulted in some grain refinement, the grain structure, even with sonic application of vibration, was not satisfactory for highly stressed operation. Furthermore, the application of vibration to a thin workpiece during welding was found to be impractical.

It has been recognized, however, that by particular control of a variation in the current density of an arc during direct current arc welding, while maintaining a continuous direct current arc between the welding apparatus and the workpiece, unusual characteristics can be achieved in the resulting weld. Such variation and control, which result in physical variation of arc voltage, can be accomplished by electrical, electronic or mechanical means well known in the welding and electrical arts.

The method and apparatus of the present invention has been found to be particularly useful in making small fillet welds on light gage material. This is particularly true with materials which do not have good wetting or flow characteristics such as high aluminum or high aluminum-titanium nickel base super alloys which form a tightly adherent oxide film. It has been found that any vibration imparted either to the welding electrode or to the workpiece without varying the current density does not result in the strong, fine grained structures which can be developed from the method and apparatus of the present invention.

As shown in the drawing, the desired variation in current density can be produced by physically changing the arcing or separation distance between the electrode and the workpiece, such as by moving the electrode normal to the weld, without extinguishing the welding arc. Such reciprocating movement should in general have an amplitude of no more than about 3/16″ and preferably less than 0.06″, preferably at a rate of 60–1000 cycles per second. Another way to vary the current density is through well known electronic or electrical means such as to impose an alternating current on the continuous direct current used for welding or to vary the amplitude and frequency of the continuously flowing direct current.

One of the measures of the soundness of a weld is its "crack index" which for the purpose of this invention is defined as that tensile load in pounds at which cracking in the weld starts in specimens of the same material and dimensions.

The method and apparatus of the present invention has been found to improve the "crack index" of specimens by about 100%.

It is believed that this increase in weld strength is based on the fact that the variation in the welding current density imparts motion to the weld pool during solidification which causes the formation of an increased number of nuclei. Hence more and therefore smaller grains form. In addition to the formation of an increased number of nuclei, a reorientation and breaking up of the dendritic structures occurs as evidenced by photomicrographs of structures welded according to the present invention.

Referring to the drawing, the method of the present invention can be practiced, in one form, by reciprocally moving an electrode 10 by mechanical means normal to a workpiece 12 during arc welding as the electrode and juncture being welded are moved relative one to the other by motion producing means, such as moving table represented by arrow 14. A direct current source 16 such as a direct current generator or rectifier impresses a potential difference between electrode 10 and workpiece 12 so that a direct current flow between the electrode and workpiece can be maintained continuously during welding. The reciprocating normal motion can be applied to electrode 10 through a reciprocating motion producing means shown generally at 18.

The motion producing means can be of an electromechanical nature or can be a mechanical device, an example of which is shown in the drawing. The means 18 consists of a fixed housing 20 enclosing a biasing means such as spring 22, compressed between the base 24 of housing 20 and cap 26 connected to shaft 28. Shaft 28 is mechanically connected to but electrically insulated from electrode 10 through coupling means 30. Cap 26 is operatively connected with wheel 32 eccentrically mounted on shaft 33 of variable speed motor 34 which, in turn, is controlled by rheostat 36.

In operation, as eccentric wheel 32 is rotated by motor 34, it imparts reciprocal movement to shaft 28 through cap 26 which is biased away from workpiece 12 by spring 22. Thus electrode 10, through coupling 30, is reciprocated normal to workpiece 12 at a frequency determined by the adjustment of rheostat 36 and a distance or amplitude determined by the shape and position of eccentric wheel 32.

With a given direct current continually passing as an arc between electrode 10 and workpiece 12, such variation of the electrode gap between electrode 10 and workpiece 12, shown by the solid and phantom positions in the drawing, results in a variation of current density which imparts to the weld pool 38 the significant shaking motion discussed before.

In another form of the apparatus of this invention, reciprocal motion producing means 18 can be replaced with an electronic means to co-operate with direct current source 16 to vary the current density electronically, as mentioned above, without extinguishing the welding arc.

If desired to protect the weld from oxidation, a fixed gas shield 40 can be adapted to surround and be electrically insulated from electrode 10 to direct an inert gas toward the workpiece as shown by arrows 42.

Example I

During operation of the apparatus of the type shown in the drawing, two pieces of 0.060" thick sheet material of the iron base composition shown above, was arc welded using a 0.060", 1 weight percent thoriated tungsten electrode ground to a conical tip and maintained at an initial electrode gap of about 0.060" from the workpiece. The welding was conducted with electrode 10 as negative and workpiece 12 as positive, the direct current source impressing a direct current of about 85 amps at an arc voltage of between 12 and 15 volts. Traverse of the electrode was about 10 inches per minute along a juncture between the two pieces 12 being joined as represented by arrow 14 in the drawing. A first specimen was welded under these conditions without varying the current density. A second specimen was welded by varying the current density through the reciprocal movement of the tungsten electrode 10 normal to the workpiece at an amplitude of 0.040" and at about 60 cycles per second. In this example, the current used with the second specimen varied from about 15 to about 2 amps as the arc voltage varied from about 15 to about 1.

The crack index of the first specimen welded through conventional means was about 500 pounds while the specimen welded according to the method and with the apparatus of the present invention had a crack index of 1000 pounds.

Example II

The apparatus and method with regard to the second specimen of Example I was repeated with a material nominally consisting essentially of, by weight, 0.4% C, 1.8% Ni, 0.8% Cr, 1.6% Si, 0.8% Mn, 0.4% Mo, 0.05% V with the balance Fe. The same improved results were obtained with the arc voltage varying between 18 and 15 while the electrode was moved reciprocally between 0.060" and 0.040" from the workpiece at about 60 cycles per second.

Although it has been recognized that ultrasonic vibration has been applied to welding apparatus and welding methods, it has been found that such high frequency vibration has a tendency to cause more cracking in the weld. Although perhaps a finer grain structure could be achieved through ultrasonic vibration, nevertheless a higher crack index can be achieved through a slower variation of current density according to the present invention.

This invention has been described in connection with specific examples. However, those skilled in the art of welding methods and apparatus will recognize the various modifications applicable to the present invention within its broad scope.

What is claimed is:

1. In a non-consumable arc welding method, the steps of varying the current density of an arc between a non-consumable arc welding electrode and a workpiece at a rate up to about 1000 cycles per second while maintaining a continuous arc between the apparatus and the workpiece.

2. In a method of direct current non-consumable arc welding, the steps of varying the current density of a direct current arc between a non-consumable arc welding electrode and a workpiece at a rate of about 60–1000 cycles per second while maintaining a continuous direct current arc between the apparatus and the workpiece.

3. In a non-consumable method of direct current arc welding, the steps of varying the current density of a direct current arc between a non-consumable arc welding electrode and a workpiece by varying the separation distance between the arc welding electrode and the workpiece at an amplitude of up to about 3/16" and at a rate of about 60–1000 cycles per second to vary the current density while maintaining a continuous direct current arc between the apparatus and the workpiece.

4. In arc welding apparatus including a non-consumable electrode and means to apply welding current between the electrode and a workpiece: current density varying means operatively connected with said electrode; and variation control means to control the current density variation of an arc drawn between a workpiece and the electrode at a rate of up to about 1000 cycles per second.

5. In arc welding apparatus including a non-consumable electrode and means to apply direct welding current between the electrode and a workpiece: current density varying means operatively connected with said electrode; and variation control means to control the current density variation of an arc drawn between a workpiece and the electrode at a rate of about 60–1000 cycles per second.

6. Direct current arc welding apparatus comprising: a non-consumable electrode; means to apply a continuous direct welding current between the electrode and a workpiece; mechanical motion producing means operatively connected with the electrode to vary the separation distance between the electrode and the workpiece during operation by moving the electrode normal to the workpiece; and motion control means to control such movement at a rate between about 60–1000 cycles per second without extinguishing the welding arc.

7. Direct current arc welding apparatus comprising: a non-consumable electrode; means to apply a continuous direct welding current between the electrode and a workpiece; mechanical motion producing means operatively connected with the electrode to vary the separation distance between the electrode and the workpiece during operation at an amplitude of up to about 3/16" by moving the electrode normal to the workpiece; and motion control means to control such movement at a rate between about 60–1000 cycles per second without extinguishing the welding arc.

References Cited by the Examiner
UNITED STATES PATENTS

| | | | |
|---|---|---|---|
| 1,318,147 | 10/19 | Herrick | 219—130 |
| 1,932,042 | 10/33 | Koch | 314—39 |
| 1,933,340 | 10/33 | Raymond | 219—124 |
| 1,984,809 | 12/34 | Requa | 219—130 |
| 2,198,472 | 4/40 | Chapman | 74—60 |
| 2,300,670 | 11/42 | Hopkins | 219—73 |
| 2,405,761 | 8/46 | Simmie | 219—130 |
| 2,440,935 | 5/48 | Dewan | 219—135 |
| 2,505,054 | 4/50 | McEhath et al. | 219—130 |
| 2,632,081 | 3/53 | Evans | 219—124 |
| 2,763,771 | 9/56 | Bichsel | 219—131 |
| 2,824,950 | 2/58 | Johnson et al. | 219—130 |
| 3,053,975 | 9/62 | Nelson et al. | 219—130 |

RICHARD M. WOOD, *Primary Examiner.*